(12) United States Patent
Kim

(10) Patent No.: US 7,586,624 B2
(45) Date of Patent: Sep. 8, 2009

(54) APPARATUS AND METHOD FOR DETECTING ERROR OF TRANSFER SYSTEM

(75) Inventor: Sang Gyu Kim, Gyeonggi-do (KR)

(73) Assignee: LG. Display Co., Ltd., Seoul (KR)

( * ) Notice: Subject to any disclaimer, the term of this patent is extended or adjusted under 35 U.S.C. 154(b) by 418 days.

(21) Appl. No.: 11/454,716

(22) Filed: Jun. 16, 2006

(65) Prior Publication Data

US 2007/0154211 A1    Jul. 5, 2007

(30) Foreign Application Priority Data

Dec. 27, 2005    (KR) .................. 10-2005-0130765

(51) Int. Cl.
*G01B 11/14* (2006.01)
(52) U.S. Cl. .................................................. 356/614
(58) Field of Classification Search .......... 356/614–633
See application file for complete search history.

(56) References Cited

U.S. PATENT DOCUMENTS 5,253,531 A * 10/1993 Walker et al. .................. 73/650
6,118,132 A *  9/2000 Tullis ...................... 250/559.39

* cited by examiner

*Primary Examiner*—Michael P Stafira
(74) *Attorney, Agent, or Firm*—Brinks Hofer Gilson & Lione

(57) ABSTRACT

An apparatus for detecting error of a transfer system that is adapted for detecting an error of a transfer system transferring a substrate loaded upon fabricating of a flat panel display device in a real time is disclosed. In the apparatus, an emitter generates a light and radiates the light into a transfer system. A receiver receives light reflected from the transfer system. A controller controls light radiation from the emitter, and measures the time such that a reflective light of the transfer system is received from an emitting point of the emitter to the receiver. The controller also detects a displacement of the transfer system using the measured time, a designated reference distance and a reference time. A display displays the displacement of the transfer system detected by the controller.

18 Claims, 7 Drawing Sheets

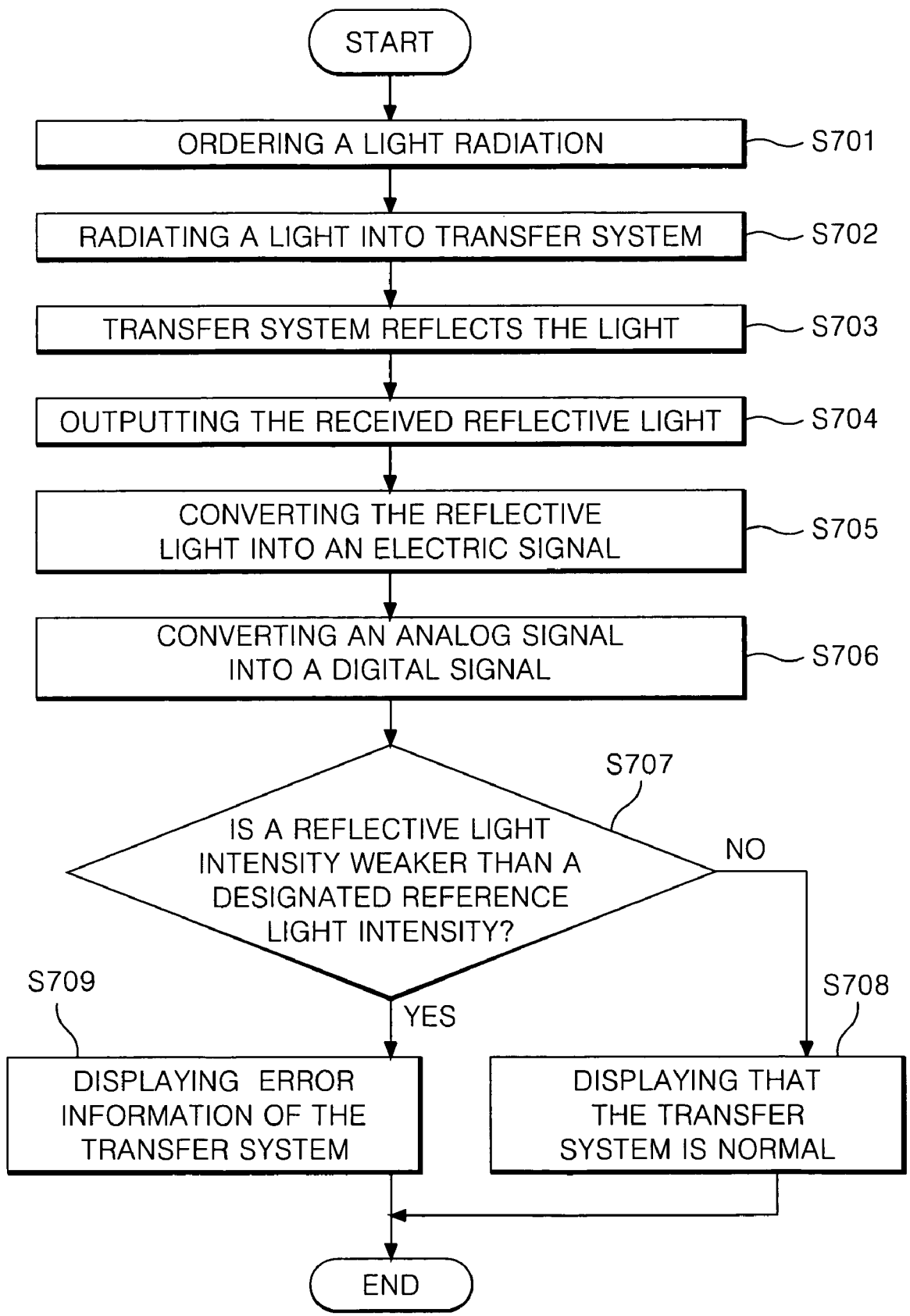

APPARATUS AND METHOD FOR DETECTING ERROR OF TRANSFER SYSTEM

This application claims the benefit of Korean Patent Application No. P2005-0130765 filed in Korea on Dec. 27, 2005, which is hereby incorporated by reference.

BACKGROUND

This invention relates to a flat panel display device including a liquid crystal display device, and specifically to an apparatus and a method that are adaptive for detecting an error of a transfer system transferring a substrate loaded upon the fabricating of a liquid crystal display device with a flat panel display device in real time.

DESCRIPTION OF THE RELATED ART

Recently, a display device is very important as a visual information communicating medium in the information society. There is an increased problem in current displays, such as the Cathode Ray Tube, which has a heavy weight and a bulky volume. Flat panel display devices have been developed to decrease the size and volume of displays. Flat panel display devices include a liquid crystal display device ("LCD"), a field emission display ("FED"), a plasma display panel ("PDP") and an electro-luminescence ("EL"), etc., and most of them are utilized and marketed.

The liquid crystal display device has a small thickness and is light-weight. LCD's improve productivity and are rapidly replacing the cathode ray tube in many applications. Particularly, an LCD device of an active matrix type for driving a liquid crystal cell using a thin film transistor ("TFT") has the advantage of high picture quality and small power consumption, and therefore, have been rapidly developed as a result of mass production techniques and increased research and development.

Referring to FIG. 1, the liquid crystal display device of the active matrix type includes a color filter array substrate 22 and a TFT array substrate 23 that are coupled with one another with a liquid crystal layer 15 therebetween. The liquid crystal display device shown in FIG. 1 shows one portion of a whole screen.

A black matrix (not shown), a color filter 13 and a common electrode 14 are located on a back side of an upper glass substrate 12 are formed at the color filter substrate 22. A polarizer 11 is attached on a front side of the upper glass substrate 12. The color filter 13 includes a red R, a green G and a blue B color filter and transmits a visible ray having a specific wavelength bandwidth to implement a color display.

In the TFT array substrate 23, data lines 19 and gate lines 18 cross each other on a front side of the lower glass substrate 16, and the TFTs 20 are formed at an intersection thereof. On the front surface of the lower glass substrate 16, a pixel electrode 21 is formed at a cell area between the data line 19 and the gate line 18. The TFT 20 switches a data transmitting path between the data line 19 and the pixel electrode 21 in response to a scanning signal from the gate line 18 to drive the pixel electrode 21. The polarizer 17 is attached at the back side of the TFT array substrate 23.

A liquid crystal layer 15 controls light transmitted via the TFT array substrate 23 through an electric field applied to the liquid crystal, layer 15. The polarizers 11 and 17 attached on the color filter substrate 22 and the TFT substrate 23, respectively, allow light polarized in any one direction to be transmitted. A polarizing direction is crossed when the liquid crystal 15 is 90° TN mode. An alignment film (not shown) may be formed on liquid crystal opposing surfaces of the color filter substrate 22 and the TFT substrate 23.

A method of fabricating a liquid crystal display device of the active matrix type is classified into a substrate cleaning, a substrate patterning process, an alignment forming/rubbing process, a substrate joining/injecting process, a packing process, an inspecting process, or a repairing process. The substrate cleaning process removes any impurity contaminating a substrate surface of the liquid crystal display device by using a cleaning solution. The substrate patterning process is divided into a patterning of a color filter array substrate and a patterning of a TFT-array substrate. In the alignment forming/rubbing process, an alignment film is coated on each color filter array substrate and TFT array substrate, and the alignment film is rubbed by a rubbing patch. In substrate joining/injecting process, the color filter substrate and the TFT array substrate are joined to each other by a sealant, and a liquid crystal and a spacer are injected through a liquid crystal injection port. Next, the liquid crystal injection port is sealed. In the packing process of a liquid crystal display panel, a tape carrier package ("TCP") is packed with an integrated circuit, a gate drive integrated circuit, and a data drive integrated circuit, which is connected to a pad portion on the substrate. The drive integrated circuit can be directly packed on the substrate by a Tape Automated Bonding type using the above-mentioned TCP or a Chip On Glass ("COG") type. The inspecting process includes an electrical inspection processed after a signal wiring such as a data line and a gate line, etc., and a pixel electrode is formed on the TFT array substrate. The electrical inspection and a naked eye inspection is processed after the substrate joining/injecting process. The repairing process is a restoration of a substrate provided that a repairing is enabled by the inspecting process. On the other hand, a non-repaired substrate in the inspecting process is disposed.

In fabricating most flat panel display devices including the LCD device, a thin film material disposed on the substrate is patterned with a photolithography process, and the photolithography process consists of a photo process including coating a photo-resist, a mask alignment, an exposure, a development and a cleaning. Once the photolithography process is completed, the substrate is transferred into another chamber for an etching and a stripping process by a transfer system. Specifically, the transfer system for transferring the substrate from one chamber to another chamber upon the fabricating of the flat panel display device is used for a variety of species. For example, referring to FIG. 2 and FIG. 3, a transfer system may include a roller and a shaft.

Referring to FIG. 2, a transfer system 100 includes a plurality of shafts 110 arranged to have a uniform or constant spaced distance on the same plane. The transfer system 100 further includes a plurality of rollers 120 fixed to have a uniform or constant spaced distance on the shaft 110. The plurality of shafts 110 are supplied with a predetermined rotary strength and rotate having a constant velocity to allow a glass substrate 130 loaded on the transfer system 100 to be transferred.

Referring to FIG. 3, a plurality of rollers 120 are formed as a disk type, and are fixed on the shaft 110 by passing through the shaft via a center portion of the disk type rollers. The plurality of rollers 120 are fixed on the shaft 110, so that the glass substrate 130 loaded on the transfer system 100 is not in contact with the shaft 110, but is directly contacted with the rollers 120. Accordingly, if the rollers 120 rotate along with the shaft 110, a frictional force between the rollers 120 and the glass substrate 130 is generated, and the frictional force becomes kinetic energy for transferring the glass substrate 130.

The flat panel display devices have tended to increase in size to result in larger viewing areas. As a result, the size of the glass substrate is also increased. Thus, the shaft 100 length of the transfer system 100 for loading and transferring the large glass substrate is lengthened. The shaft 110 length of the transfer system 100 may correspond with the size of the glass substrate that is passed with the transfer system 110.

When the shaft 110 is lengthened, and the size and weight of the glass substrate are increased, there is an increased problem that the shaft 110 may become distorted or transformed by the weight of the glass substrate. If the shaft 110 is transformed, then a plurality of problems may be generated causing the glass substrate to break or become damaged upon transferring. For example, if a wet-etching process using a track means is used, the flatness of the glass substrate must be maintained, so that it becomes possible to uniformly maintain and manage.

BRIEF SUMMARY OF THE EMBODIMENTS

In a first aspect, an apparatus detects an error in a transfer system. The apparatus includes an emitter for generating light that radiates into the transfer system. A receiver receives the light reflected from the transfer system. A controller coupled with the receiver, controls light radiation from the emitter and calculates a measured time from when the reflective light of the transfer system is received from an emitting point of the emitter to the receiver. The controller also detects a displacement of the transfer system using the measured time, a designated reference distance and a reference time. A display coupled with the controller, displays the displacement of the transfer system detected by the controller.

In a second aspect, an apparatus detects the error of a transfer system. The apparatus includes an emitter for generating a light and for radiating the light into the transfer system. A receiver receives a reflected light from the transfer system. A controller coupled with the receiver detects an error using an intensity of the reflected light sensed by the receiver and an intensity of a designated reference light. A display coupled with the controller displays error information of the transfer system detected by the controller.

In a third aspect, a method is disclosed for detecting an error of a transfer system. The method includes generating a light and radiating the light into the transfer system. A timer measures a recorded time. Reflective light is received from the transfer system and the timer is stopped. A displacement of the transfer system is detected using the recorded time, a designated reference distance and a designated reference time. The displacement of the detected transfer system is then displayed.

In a fourth aspect, a method is disclosed for detecting error of a transfer system. The method includes generating a light and radiating the light into the transfer system. An intensity of a reflective light reflected by the transfer system is measured. An error of the transfer system is detected using the intensity of the reflective light and a designated reference light intensity. The detected error information of the transfer system is then displayed.

BRIEF DESCRIPTION OF THE DRAWINGS

FIG. 7 is a flowchart showing a method of detecting an error of the transfer system according to another embodiment.

DETAILED DESCRIPTION OF THE EMBODIMENTS

Hereinafter, the preferred embodiments of the present invention will be described in detail with reference to the accompanying drawings.

Figure 1:
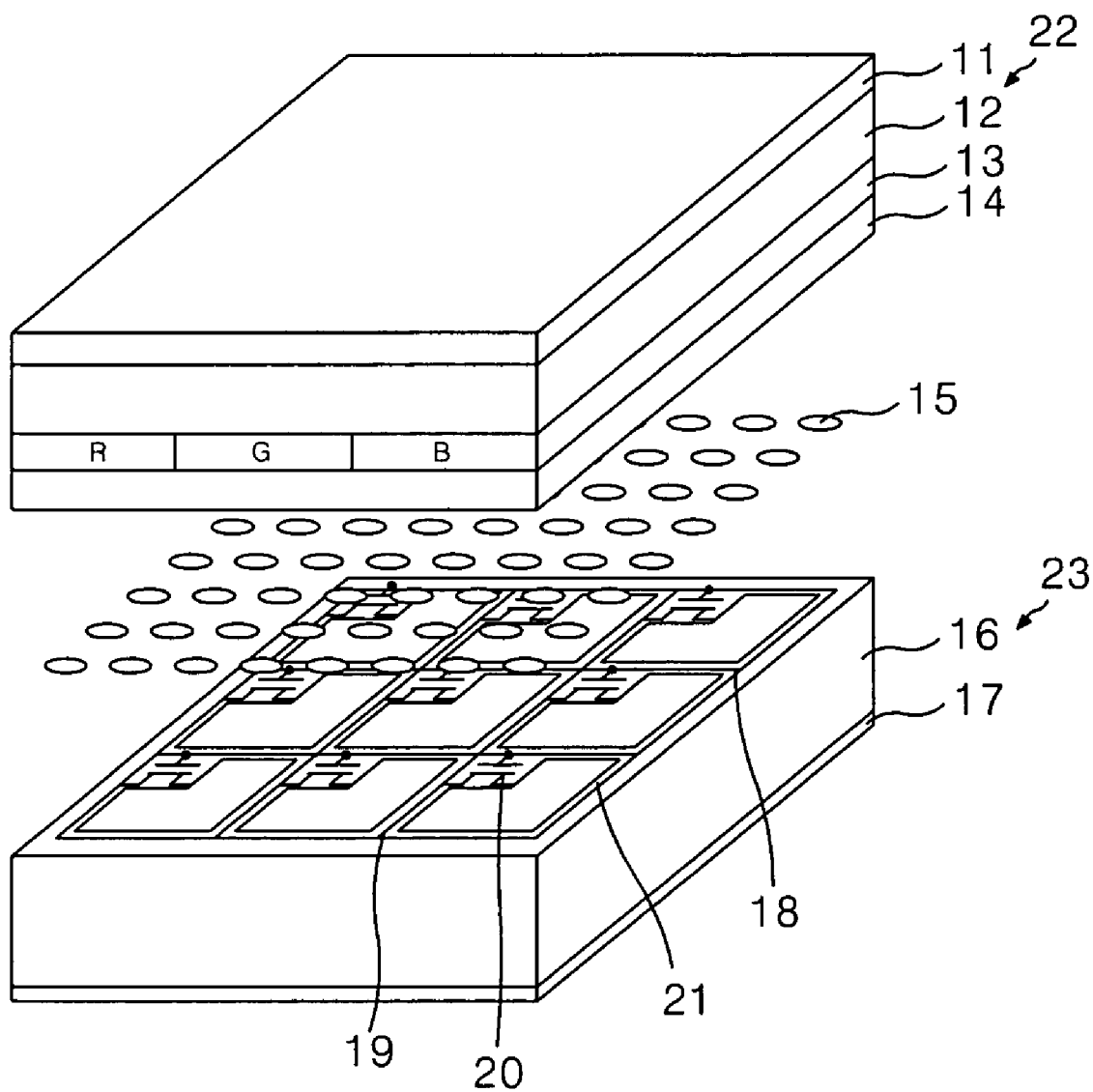
FIG. 1 is a perspective view showing a liquid crystal display device of an active matrix type of the related art.
Figure 2:
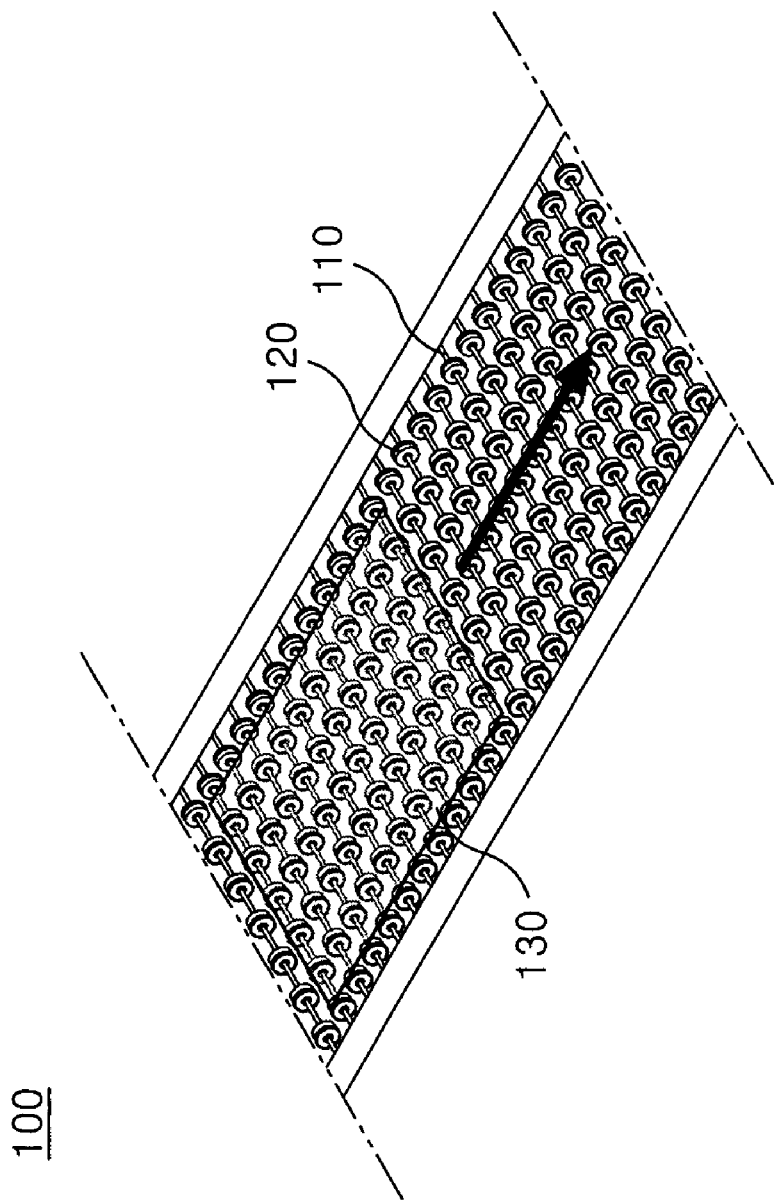
FIG. 2 is a perspective view showing a transfer system using a method of fabricating a related art flat panel display device.
Figure 3:
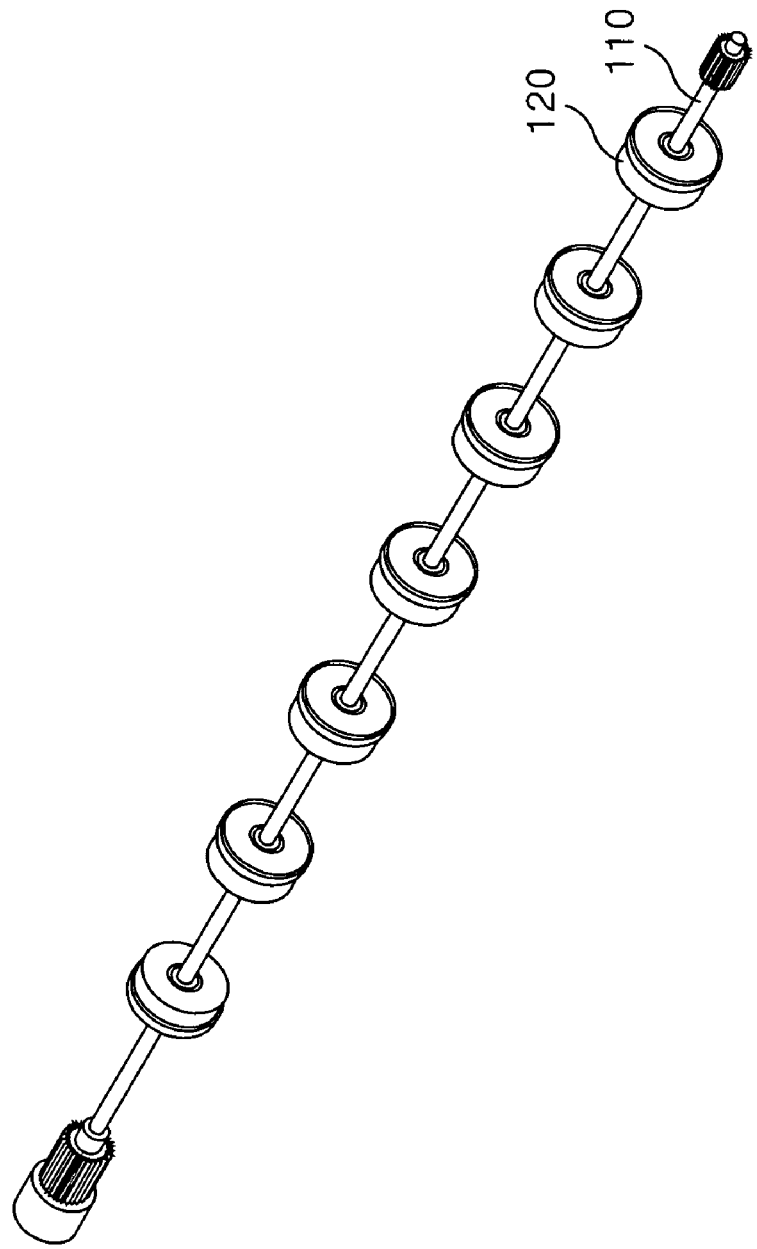
FIG. 3 is a perspective view showing a roller and a shaft included in a transfer system using a related art method of fabricating a flat panel display device.
Figure 4:
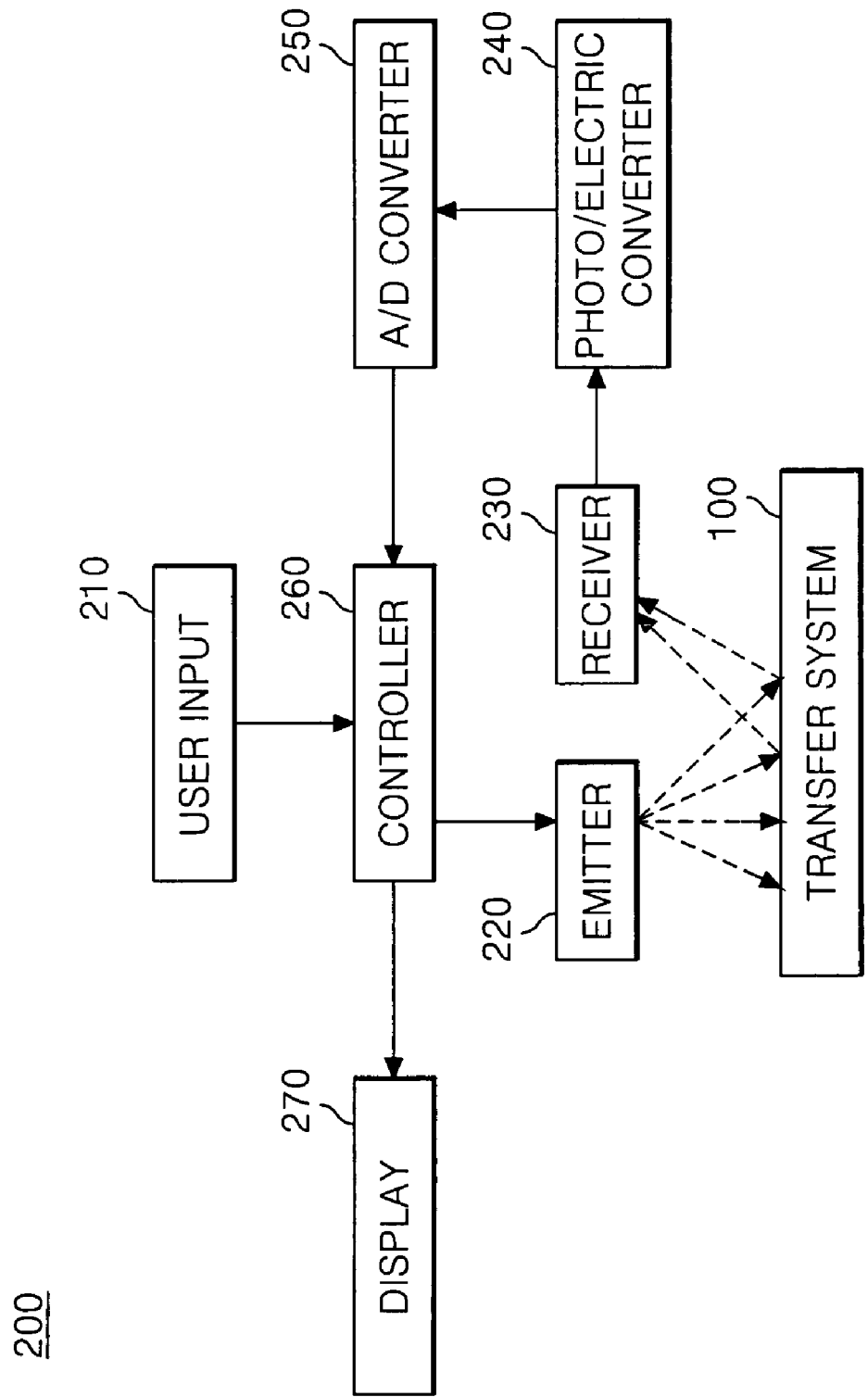
FIG. 4 is a diagram of an error detecting apparatus of the transfer system according to a first embodiment.

FIG. 4 is a diagram of an error detecting apparatus of the transfer system according to a first embodiment. Referring to FIG. 4, an error detecting apparatus 200 of the transfer system according to a first embodiment includes a user input 210 for inputting a user command regarding a displacement detection for the transfer system 100. An emitter 220 generates light and for radiating into the transfer system 100. A receiver 230 receives light reflected from the transfer system 100. A photo-electric converter 240 converts a light signal detected by the receiver 230 into an electric signal. An A/D converter 250 converts an analog electric signal converted by the photo-electric converter 240 into a digital electric signal. A controller 260 controls the emitter 220 according to a command inputted by the user input part 210. The controller 260 records a reflecting time. The reflecting time measures the time from reflective light transmitted by the emitter 220 until it is reflected by the transfer system 100. The timed reflective time is used for detecting a displacement of the transfer system. A display part 270 displays a displacement of the transfer system 100 outputted from the controller 260.

If the shaft 110 and the roller 120 of the transfer system 100 do not reflect light and are formed of a material with an absorbing property, then a light reflective material (not shown) may be attached to the shaft 110 and/or the roller 120. The reflective material may comprise a sheet that can be attached to the shaft 110 and/or the roller 120. A displacement of the transfer system 100 is detected in a first embodiment of the present invention by measuring the distance difference between the transfer system 100 in a normal horizontal state and the transformed transfer system 100 when it is not maintained in a horizontal state as a result of a transformation such as a distortion, etc.

The user input 210 allows for inputting a user command indicating displacement detection of the transfer system 100. The user input 210 may be implemented with buttons, a keyboard, or a touch screen type. The user may indicate the displacement detection of the transfer system 100 into the controller 260 by using the user input 210. If the emitter 220 is supplied with an emitting controlling signal indicating an emitting from the controller 260, the emitter 220 generates light and radiates into the transfer system 100. The receiver 230 receives the reflective light to output to the photo-electric converter 240. The receiver 230 receives the reflective light if the light radiated from the emitter 220 is reflected from the transfer system 100.

The photo-electric converter 240 converts light outputted from the receiver 230 into an electric signal to output to the A/D converter 250. A photo-electric converting device converts a light signal received from the receiver 230 into the electric signal to output. For example, a photo diode may be implemented, such that the photo-electric converter 240, and an electric signal may be converted by the receiver 230 and is directed inputted into the A/D converter 250. The A/D converter 250 converts an analog electric signal inputted from the photo-electric converter 240 into a digital electric signal to output into the controller 260. In an alternate embodiment, if the controller 260 is implemented to include a signal system for processing the analog electric signal, then the A/D converter 250 is not adopted as a separate component, and an analog electric signal converted by the receiver 230 and the photo-electric converter 240 is directly inputted into the controller 260.

The controller 260 is implemented to control displacement detection of the transfer system 100 according to a user indication inputted by the user input 210. For example, if the power is turned-on, the controller 260 may be implemented to control the displacement detection of the transfer system 100 automatically. In the controller 260, a method of detecting the displacement of the transfer system 100 will be described in more detail below.

Firstly, equation (1) and equation (2) are used for detecting the displacement of the transfer system 100 and are set in the controller 260. A program for calculating the displacement of the transfer system 100 is set by using equation (1) and equation (2).

$$t1:s1=t2:s2 \quad (1)$$

$$\Delta s=s2-s1 \quad (2)$$

t1 represents a predetermined time interval from the time light is radiated from the emitter 220 and reflected by the transfer system 100 of a normal horizontal state to the time the light is received into the receiver 230. s1 represents a predetermined linear distance between the emitter 220 and the transfer system 100. t2 represents a timed time interval from the time that light is radiated from the emitter 220 and reflected by the transfer system 100 to the time that the light is received into the receiver 230. s2 represents a linear distance between the emitter 220 and the transfer system 100 calculated by the designated equation, and Δs represents the displacement value of the transfer system 100 to be detected by the controller 260 according to the present embodiments.

For example, t1 may be 1 second, and s1 may be 1 millimeter, and if the time t2 that it takes light radiated from the emitter 220 and reflected by the transformed transfer system 100 to be received into the receiver 230 is 2 seconds, then the linear distance s2 between the emitter 220 and the transformed transfer system 100 is 2 millimeters according to equation (1). Next, the controller 260 subtracts the designated distance s1 from a distance variable s2 by equation (2) to detect the displacement Δs of the transformed transfer system 100. Based on the example values discussed above, Δs would be 1 millimeter.

The controller 260 continues timing from a point when light is radiated from the emitter 220 to a point when radiated light is reflected by the transfer system 100 to be received into the receiver 230. This timing is used in order to detect a time t2 that a light radiated from the emitter 220 is reflected by the transfer system 100 to be received by the receiver 230. A time when a light signal is received into the receiver 230 is converted into the digital signal to be inputted into the controller 260 is excluded in the time variable t2.

The display part 270 may be implemented in an LCD device or a plasma display panel ("PDP"), and displays the displacement of the transfer system 100 detected by the controller 260. The controller 260 displays the displacement of the transfer system 100 at the display part 270 and displays information about a transformation of the transfer system 100 at the display part 270.

Figure 5:
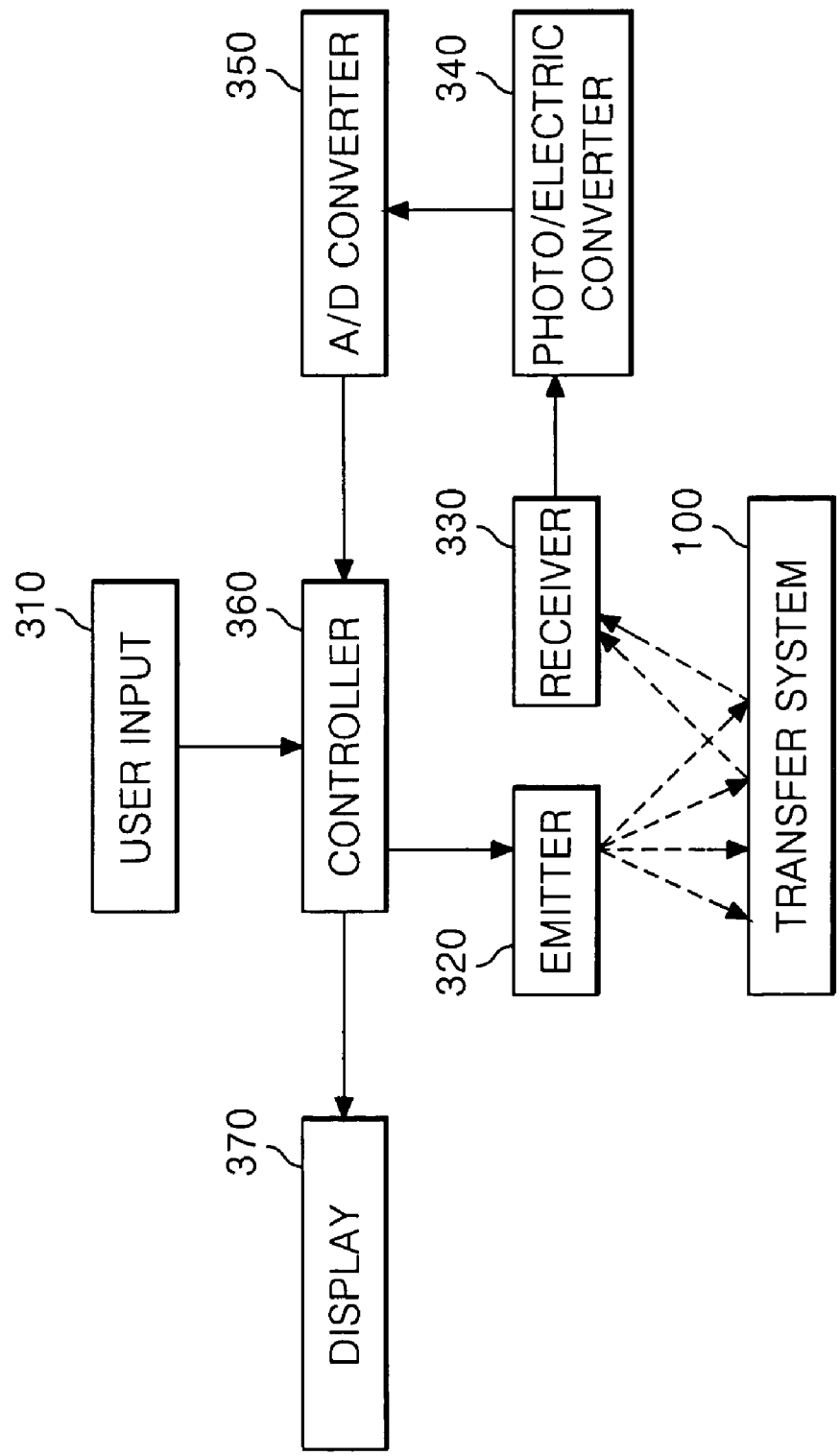
FIG. 5 is a diagram of an error detecting apparatus of the transfer system according to another embodiment.

FIG. 5 is a block diagram of an error detecting apparatus of the transfer system according to another embodiment. Referring to FIG. 5, an error detecting apparatus 300 of the transfer system according to an alternate embodiment includes a user input 310 for inputting a user command regarding error detection of transfer system 100. An emitter 320 generates light and that radiates into transfer system 100. A receiver 330 receives light reflected from the transfer system 100. A photo-electric converter 340 converts a light signal detected by the receiver 330 into an electric signal. Next, an A/D converter 350 converts an analog electric signal, which was converted by the photo-electric converter 340 into a digital electric signal. A controller 360 controls the emitting of the emitter 320 according to a command inputted by the user input part 310, and detects an error of the transfer system 100 using a reflective light intensity sensed by the receiver 330 and reflected by the transfer system 100. A display part 370 then displays error information of the transfer system 100 outputted from the controller 360.

If the shaft 110 and the roller 120 of the transfer system 100 do not reflect light and are formed of a material with an absorbing property, then a light reflective material (not shown) may be implemented in a sheet form and attached to the shaft 110 and/or the roller 120. An error of the transfer system 100 that may be detected in another embodiment is a distortion of the transfer system 100 or a transformation, etc.

The user input 310 allows for inputting a user command indicating an error detection of the transfer system 100. The user input 310 may be implemented as a button, keyboard, or as a touch screen type. In other words, the user may indicate the error detection of the transfer system 100 into the controller 360 with the user input 310. If the emitter 320 is supplied with an emitting controlling signal indicating an emitting from the controller 360, the emitter 320 generates light and radiates it into the transfer system 100. The receiver 330 receives the reflective light to output to the photo-electric converter 340, if light radiated from the emitter 320 is reflected from the transfer system 100.

The photo-electric converter 340 converts light outputted from the receiver 330 into an electric signal to output as an electric signal in proportion to the received light signal intensity into the A/D converter 350. A photo-electric converting terminal converts a light signal received by the receiver 330 into an electric signal to output. In an alternate embodiment, a photo diode may be implemented, such that the photo-electric converter 340 is not a separate component. An electric signal is converted by the receiver 330 and is directly inputted into the A/D converter 350. The A/D converter 350 converts an analog electric signal inputted from the photo-electric converter 340 into a digital electric signal to output into the controller 360. In an alternate embodiment, if the controller 360 is implemented to include a signal system for processing the analog electric signal, the A/D converter 350 is not a separate component. An analog electric signal may then be converted by the receiver 330 and the output from the photo-electric converter 340 is directly input into the controller 360.

The controller 360 is implemented to control displacement detection of the transfer system 100 according to a user indication inputted by the user input 310. For example, if the power is turned-on, the controller 360 may be implemented to control the displacement detection of the transfer system 100 automatically. In the controller 360, a method of detecting the displacement of the transfer system 100 will be described in more detail below.

If light radiated from the emitter 320 is reflected by the transfer system 100 and received into the receiver 330. The receiver 330 transmits a light signal in proportion to a quantity of the received light into the controller 360. If a light signal sensed by the receiver 330 is transmitted into the controller 360, the controller 360 may compare intensity of the reflective light sensed by the receiver 330 with a designated or predetermined reference light intensity. The designated reference light intensity is an intensity of reflective light reflected from the transfer system 100, such that the transfer system 100 is in a horizontal state. The designated reference light intensity may be measured or determined through experimentation.

If the intensity of the reflective light and the designated reference light intensity are the same, the controller 360 knows that an error was not generated in the transfer system 100, and displays this fact into the display part 370. If the intensity of the reflective light is weaker than the designated reference light intensity, the controller 360 knows that an error is generated in the transfer system 100, and displays the error onto the display part 370.

According to one embodiment, a displacement of the transfer system 100 is automatically detected. The displacement may be present in a transfer system 100 while transferring the loaded substrate upon fabricating of the flat panel display device. A variety of errors may be detected and displayed in a real time to prevent damage to a substrate in a transferring process. Thus, it may be possible to improve productivity of the product.

Figure 6:
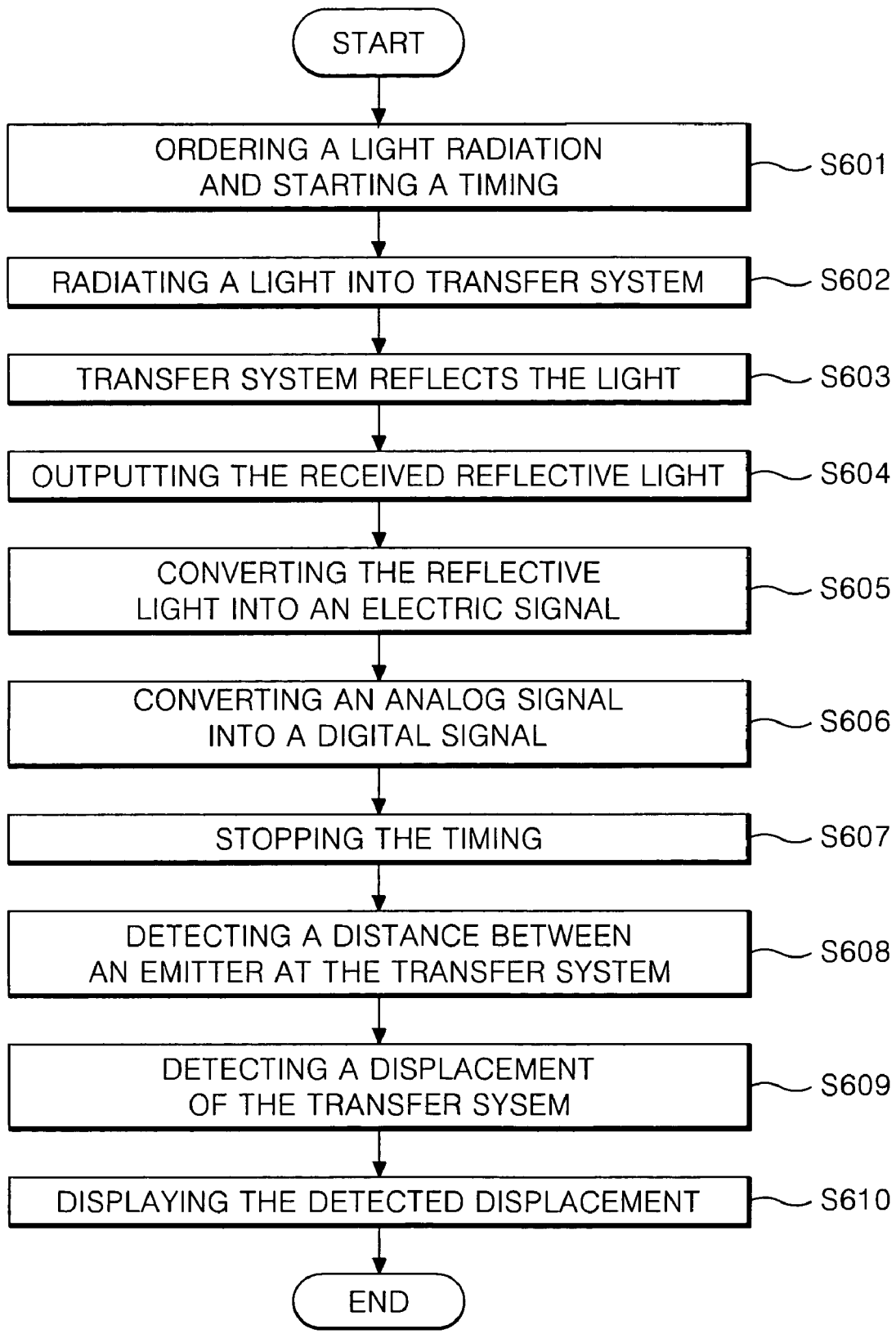
FIG. 6 is a flowchart showing a method for detecting an error of the transfer system according to the first embodiment.

An error detecting apparatus of the transfer system according to one embodiment having such structure will be described with reference to a flow chart of a process for detecting an error of the transfer system 100. FIG. 6 is a flow chart showing a method for detecting an error of the transfer system according to the first embodiment. Referring to FIG. 6, a user initiates or orders a displacement detection of the transfer system 100 which is inputted from a user. The controller 260 supplies an emitting controlling signal to the emitter 220 to indicate light radiating, which starts a timer from a emitting point (S601). The emitter 220 generates light corresponding to the emitting controlling signal to radiate to the transfer system 100 (S602).

The transfer system 100 reflects light inputted from the emitter 220 (S603), and the receiver 230 receives the light reflected from the transfer system 100 to output into the photo-electric converter 240 (S604). Next, the photo-electric converter 240 converts a light signal inputted from the receiver 230 into an electric signal to output into the A/D converter 250 (S605). The A/D converter 250 converts an analog electric signal inputted from the photo-electric converter 240 into a digital electric signal adapting a signal system of the controller 260 to output into the controller 260.

If a reflective light from the transfer system 100 is received into the receiver 230, the controller 260 receives the reflective light, and stops a timer from an emitting point of the emitter 220 to sense the reflective light and stores a time from the timer (S607). The controller 260 inserts the time from the timer into equation (1) to detect a maximum linear distance between the emitter 220 and the transfer system 100 (S608). Referring to equation (2), the displacement of the transformed transfer system 100 is detected by subtracting a designated reference distance from the detected maximum linear distance (S609). If the displacement of the transformed transfer system 100 is detected, the controller 260 displays the detected displacement on the display part 270 (S610). The controller 260 may display the displacement of the transfer system 100 on the display part 270 and also may display information about a transformation of the transfer system 100. If the transfer system 100 is determined to be in a normal state, the controller 260 may display that the transfer system 100 is normal.

FIG. 7 is a flow chart showing a method of detecting an error of the transfer system according to another embodiment. Referring to FIG. 7, if an order indicating displacement detection of the transfer system 100 is inputted from a user, the controller 360 supplies an emitting controlling signal to the emitter 320 to indicate a light radiating (S701). The emitter 320 generates light corresponding to the emitting controlling signal to radiate into the transfer system 100 (S702).

The transfer system 100 reflects light inputted from the emitter 320 (S703). The receiver 330 receives the light reflected from the transfer system 100 to output into the photo-electric converter 340, that is, to output a light signal in proportion to the sensed light quantity (S704). Next, the photo-electric converter 340 converts a light signal inputted from the receiver 330 into an electric signal to output into the A/D converter 350. In other words an electric signal in proportion to an intensity of the light signal is outputted (S705). The A/D converter 350 converts an analog electric signal inputted from the photo-electric converter 340 into a digital electric signal adapting a signal system of the controller 360 to output into the controller 360. In other words, the outputted digital signal is in proportion to a magnitude of the analog electric signal (S706).

If the digital signal in proportion to the intensity of the received light signal is inputted, the controller 360 determines whether or not the intensity of the sensed reflective light is weaker than that of a designated reference light (S707). If the intensity of the reflective light and the designated reference light intensity are the same, the controller 360 knows that an error is not generated in the transfer system 100, and displays that there is no error on the display part 370 (S708). If the intensity of the reflective light is weaker than the designated reference light intensity, the controller 360 knows that an error is generated in the transfer system 100, and displays the error on the display part 370 (S709). Additionally, the display may include additional information about the error.

The present embodiments include automatic detection of an error of the transfer system transferring the loaded substrate upon fabricating of the flat panel display device. A display in real time allows a user to easily identify an error of the transfer system. Thus, it becomes possible to prevent a damage of a substrate in a transferring process.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive or limiting, and the appended claims are intended to cover all such modifications, enhancements, and other embodiments, which fall within the true spirit and scope of the present invention. Thus, to the maximum extent allowed by law, the spirit and scope of the present invention is to be determined by the broadest permissible interpretation of the following claims, including all equivalents, and shall not be restricted or limited by the foregoing detailed description.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

What is claimed is:

1. An apparatus for detecting an error in a transfer system, comprising:
   an emitter for generating a light and for radiating into the transfer system;
   a receiver for receiving the light reflected from the transfer system;
   a controller coupled with the receiver that controls light radiation of the emitter and that times a measured time from when the reflective light of the transfer system is received from an emitting point of the emitter to the receiver, wherein the controller detects a displacement of the transfer system using the measured time, a designated reference distance and a reference time; and
   a display coupled with the controller that displays a displacement of the transfer system detected by the controller.

2. The apparatus of claim 1, wherein the controller inserts the measured time into a designated equation in which a designated reference distance and a designated reference time are used to detect a distance between the emitter and the transfer system.

3. The apparatus of claim 2, wherein the controller detects a maximum linear distance between the emitter and the transfer system by the designated equation.

4. The apparatus of claim 3, wherein the controller subtracts the designated reference distance from the detected distance to detect a displacement of the transfer system.

5. The apparatus of claim 1, wherein the controller displays the displacement of the detected transfer system and error information of the transfer system on the display.

6. An apparatus for detecting error of a transfer system, comprising:
   an emitter for generating a light and for radiating the light into the transfer system;
   a receiver for receiving a reflected light from the transfer system;
   a controller coupled with the receiver and for detecting an error using an intensity of the reflected light sensed by the receiver and an intensity of a designated reference light; and
   a display coupled with the controller and for displaying error information of the transfer system detected by the controller,
   wherein the controller compares an intensity of the reflected light with the designated reference light to determine if there is an error of the transfer system.

7. The apparatus of claim 6, wherein if the intensity of the reflected light and the designated reference light intensity are the same, the transfer system is normal and there is no error.

8. The apparatus of claim 6, wherein if the intensity of the reflected light is weaker than the designated reference light intensity, the controller knows that an error is generated in the transfer system.

9. A method for detecting error of a transfer system, comprising:
   generating a light and radiating the light into the transfer system;
   starting a timer to measure a recorded time upon generating the light;
   receiving a reflective light from the transfer system and stopping the timer in response to receiving the reflective light;
   detecting a displacement of the transfer system using the recorded time, a designated reference distance and a designated reference time; and
   displaying the displacement of the detected transfer system.

10. The method as in claim 9, wherein the recorded time is inserted into a designated equation in which the designated reference distance and the designated reference time are used to detect a distance for detecting a displacement of the transfer system.

11. The method as in claim 10, wherein the equation is $t1:s1=t2:s2$, wherein the t1 represents the designated reference time from that a light radiated from the emitter and reflected by the transfer system of a normal horizontal state to that the light is received into the receiver, the s1 represents the designated reference distance between the emitter and the transfer system, the t2 represents the recorded time, the s2 represents a linear distance between the emitter and the transfer system calculated by the equation.

12. The method as in claim 11, wherein the designated reference distance is subtracted from the linear distance to detect a displacement of the transfer system.

13. The method as in claim 9, wherein the displacement of the detected transfer system, and error information of the transfer system are displayed on the display.

14. A method for detecting error of a transfer system, comprising:
generating a light and radiating the light into the transfer system;
sensing an intensity of a reflective light reflected by the transfer system;
detecting an error of the transfer system by using the intensity of the reflective light and a designated reference light intensity; and
displaying the detected error of the transfer system, wherein the detecting step includes comparing whether or not an intensity of the reflective light is weaker than that of the designated reference light to identify an error of the transfer system.

15. The method as in claim 14, wherein if the intensity of the reflective light and the designated reference light intensity are the same, the transfer system is normal.

16. The method as in claim 14, wherein if the intensity of the reflective light is weaker than the designated reference light intensity, the transfer system identifies the error.

17. The method as in claim 14, wherein the intensity of the reflective light is in proportion to light quantity.

18. The method as in claim 14, wherein the error comprises at least one of a displacement of the transfer system, a transformation of the transfer system, or combinations thereof.

* * * * *

UNITED STATES PATENT AND TRADEMARK OFFICE
CERTIFICATE OF CORRECTION

PATENT NO.       : 7,586,624 B2                                    Page 1 of 1
APPLICATION NO. : 11/454716
DATED            : September 8, 2009
INVENTOR(S)      : Sang Gyu Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 502 days.

Signed and Sealed this

Twenty-first Day of September, 2010

David J. Kappos
*Director of the United States Patent and Trademark Office*